(12) United States Patent
Overman et al.

(10) Patent No.: US 8,925,325 B2
(45) Date of Patent: Jan. 6, 2015

(54) RECIRCULATING PRODUCT INJECTION NOZZLE

(75) Inventors: Nicholas R. Overman, West Des Moines, IA (US); John Earl Short, Norwalk, IA (US)

(73) Assignee: Delavan Inc., West Des Moines, IA (US)

(*) Notice: Subject to any disclaimer, the term of this patent is extended or adjusted under 35 U.S.C. 154(b) by 908 days.

(21) Appl. No.: 13/083,298

(22) Filed: Apr. 8, 2011

(65) Prior Publication Data
US 2012/0234013 A1    Sep. 20, 2012

Related U.S. Application Data

(60) Provisional application No. 61/454,356, filed on Mar. 18, 2011.

(51) Int. Cl.
| F02C 1/00 | (2006.01) |
| F23R 3/16 | (2006.01) |
| F23R 3/28 | (2006.01) |
| F23R 3/50 | (2006.01) |
| F23R 3/34 | (2006.01) |
| F23R 3/12 | (2006.01) |
| F23C 9/00 | (2006.01) |

(52) U.S. Cl.
CPC ............... *F23R 3/283* (2013.01); *Y02E 20/342* (2013.01); *F23R 2900/03282* (2013.01); *F23R 3/16* (2013.01); *F23C 2900/99001* (2013.01); *F23R 3/50* (2013.01); *F23R 3/343* (2013.01); *F23R 3/12* (2013.01); *F23C 9/006* (2013.01); *Y02T 50/675* (2013.01)
USPC ................... 60/750; 60/737; 60/742; 60/746; 60/748; 60/749

(58) Field of Classification Search
CPC ............... F23R 3/12; F23R 3/14; F23R 3/16; F23R 3/28; F23R 3/30; F23R 3/32; F23R 3/34; F23R 3/283; F23R 3/286; F23R 2900/03282; F23C 2900/99001; F23C 9/006; Y02E 20/342; Y02T 50/675

USPC ............................. 60/737, 740, 742, 746–750
See application file for complete search history.

(56) References Cited

U.S. PATENT DOCUMENTS

| RE23,149 E | | 9/1949 | Lubbock et al. |
| 4,237,694 A | * | 12/1980 | Wood et al. ................... 60/738 |

(Continued)

FOREIGN PATENT DOCUMENTS

| CA | 2595061 A1 | 1/2009 |
| EP | 0687864 B1 | 9/2003 |
| WO | WO2009121780 | * 10/2009 ............... F23C 7/00 |

OTHER PUBLICATIONS

The Extended European Search Report, dated Aug. 10, 2012, for European Patent Application No. 12250061.4.

(Continued)

*Primary Examiner* — Ehud Gartenberg
*Assistant Examiner* — Lorne Meade
(74) *Attorney, Agent, or Firm* — Edwards Wildman Palmer LLP; Scott D. Wofsy; Joshua L. Jones

(57) ABSTRACT

Combustion systems and the related methods operate to supply a stream of combustion products to a turbine in a gas turbine engine by forming an outer recirculation zone of recirculating combustion products within a combustor and by forming an inner recirculation zone inboard of the outer recirculation zone. The inner and outer recirculation zones are formed by imparting swirl to compressor discharge air passing through an outer air swirler and an inner air swirler radially inboard of the outer air swirler. Fuel is injected from an outer fuel injector into the outer recirculation zone, and fuel is also injected from an inner fuel injector into the inner recirculation zone.

16 Claims, 11 Drawing Sheets

(56) References Cited

U.S. PATENT DOCUMENTS

| | | | |
|---|---|---|---|
| 4,977,740 A * | 12/1990 | Madden et al. | 60/39.463 |
| 5,076,061 A | 12/1991 | Shekleton et al. | |
| 5,319,935 A | 6/1994 | Toon et al. | |
| 7,464,553 B2 | 12/2008 | Hsieh et al. | |
| 7,565,803 B2 | 7/2009 | Li et al. | |
| 7,581,396 B2 | 9/2009 | Hsieh et al. | |
| 7,762,073 B2 * | 7/2010 | Li et al. | 60/748 |
| 8,033,112 B2 * | 10/2011 | Milosavljevic et al. | 60/737 |
| 8,561,409 B2 * | 10/2013 | Milosavljevic | 60/737 |
| 8,667,800 B2 * | 3/2014 | Cornwell et al. | 60/750 |
| 2004/0209129 A1 | 10/2004 | Carrea | |
| 2005/0155351 A1 | 7/2005 | Wunning et al. | |
| 2008/0083224 A1 | 4/2008 | Varatharajan et al. | |
| 2008/0236165 A1 | 10/2008 | Baudoin et al. | |
| 2009/0113893 A1 * | 5/2009 | Li et al. | 60/737 |
| 2009/0139240 A1 * | 6/2009 | Rackwitz et al. | 60/740 |
| 2010/0287939 A1 * | 11/2010 | Cornwell et al. | 60/748 |

OTHER PUBLICATIONS

Guillou, Erwann, "Flame Characteristics and Application of Flameless Combustion," A thesis submitted to the Graduate Faculty of the University of Cincinnati, Dec. 2, 2007.

Invitation to Rectify Deficiencies for Swedish Application No. 1050460-3 (Apr. 4, 2011).

UK Search Report dated Jul. 13, 2010 for GB 1007945.7.

* cited by examiner

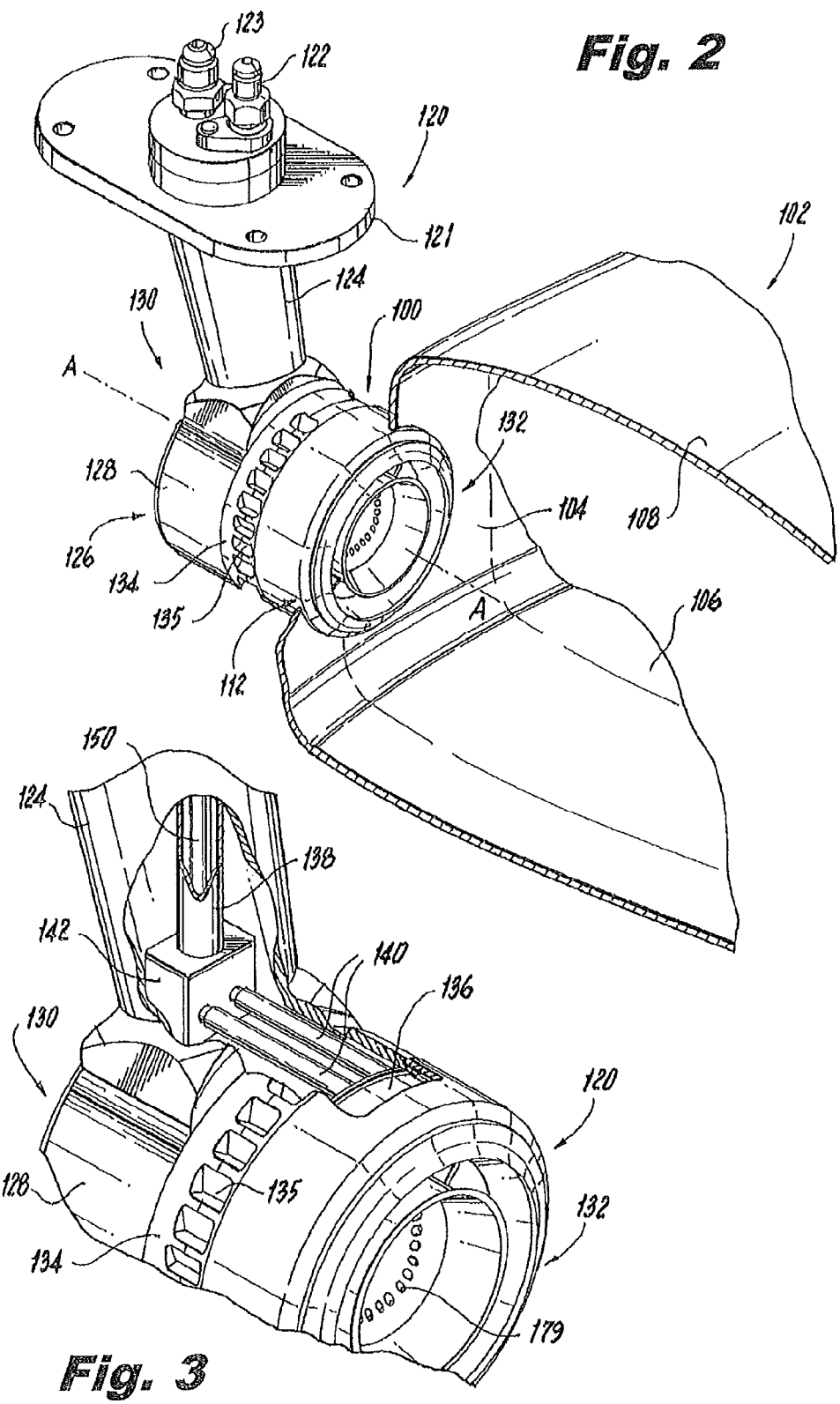

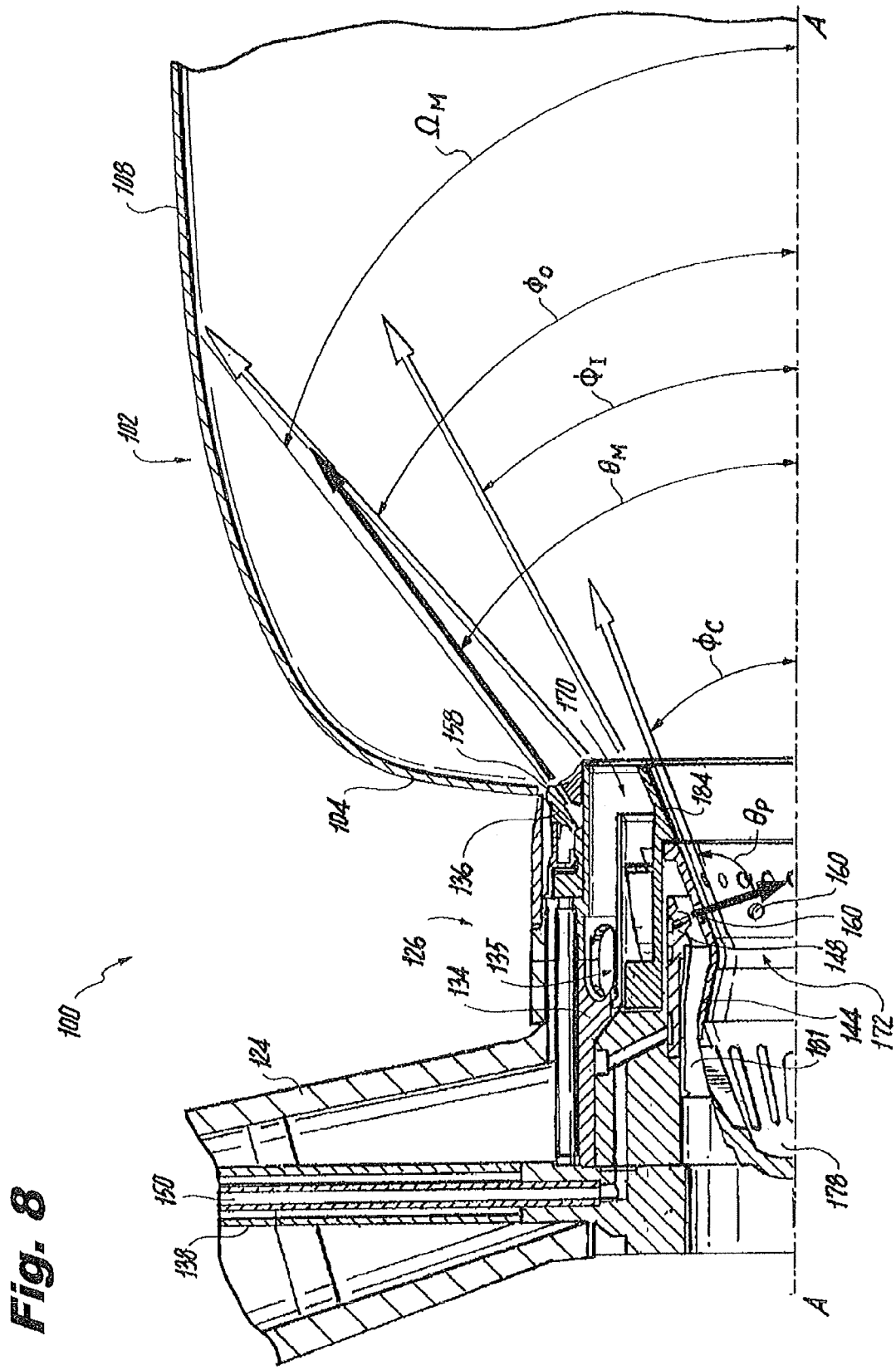

RECIRCULATING PRODUCT INJECTION NOZZLE

CROSS-REFERENCE TO RELATED APPLICATIONS

This application claims priority to U.S. Provisional Patent Application No. 61/454,356 filed Mar. 18, 2011, which is incorporated by reference herein in its entirety.

BACKGROUND OF THE INVENTION

1. Field of the Invention

The present invention relates to combustion systems, and more particularly to lean combustion systems for distributed combustion, such as in gas turbine engines.

2. Description of Related Art

A number of nozzles and injectors are known in the art for injecting fuel for combustion, such as in furnaces, gas turbine engines, and the like. The trend in the gas turbine industry, for example, has been to operate engines at increasingly lean fuel-to-air ratios and under higher combustor pressures to reduce emissions of environmentally harmful products of incomplete combustion, such as oxides of nitrogen ($NO_X$) and to reduce specific fuel consumption. However, operating at leaner, higher pressure conditions leads to increased probability and magnitude of combustion instabilities that can result in flame blow out or induce vibration modes that can damage engine components. Current technology utilizes techniques such as lean direct injection and premixing (or partial premix) of fuel and air prior to combustion. These methods are susceptible to lean instabilities that limit engine operating envelopes. Another method of lowering $NO_X$ emissions has been to reduce combustion residence time through shortening flow paths through combustors. This leads to instabilities at higher frequencies, which are more damaging than low frequency instabilities as they can couple with resonating acoustic patterns. This approach can also increase levels of unburned hydrocarbons (UHC) and/or carbon monoxide (CO) which are also environmentally damaging.

One way of providing stable combustion at very lean conditions is to use a distributed combustion process, sometimes called flameless combustion. Most combustion instabilities involve a three part cyclic process. First, fluid mechanical phenomena produces a fluctuation in heat release rate which then couples and reinforces an acoustic mode. This in turn trips an unstable fluid dynamic structure, which leads to fluctuations in heat release rate, and so on. In distributed combustion, no such a coupling occurs. The inability of coupling of this kind to occur in distributed combustion inhibits strong acoustic waves that could otherwise damage the combustor or turbine blades.

Distributed combustion has been successfully demonstrated in industrial furnaces. The technique involves using a very lean mixture wherein high temperature oxidizer reacts with fuel at very high levels of turbulence in a distributed reaction zone. Distributed combustion has been shown to produce very stable combustion having low $NO_X$ levels in industrial furnaces. Distributed combustion is sometimes called "flameless combustion" because of the lack of a discrete visible flame resulting from the distributed nature of the reaction. In industrial furnace applications of distributed combustion, the required high oxidizer temperatures are obtained by either preheating the air with furnace exhaust gases through a heat exchanger or by direct mixing of the air with hot recirculated exhaust gas. These furnaces typically recycle combustion gases via a duct external to the combustion region. These ducts and/or heat exchangers in conventional burners are heavy and take up considerable space and have therefore limited the practical application of distributed combustion.

Such conventional methods and systems have generally been considered satisfactory for their intended purpose. However, there is still a need in the art for methods and systems that allow for reduction of $NO_X$, CO, and UHC while increasing lean stability beyond the state of the art. There also remains a need in the art for such methods and systems that are simpler to make and use. The present invention provides a solution for these problems.

SUMMARY OF THE INVENTION

The subject invention is directed to a new and useful recirculation product injection nozzle. The recirculation product injection nozzle includes a nozzle housing having an inlet end and opposed outlet end. The nozzle housing defines a central axis along a direction from the inlet end to the outlet end. An outer air swirler is mounted to the nozzle housing and is configured to impart swirl to a flow of compressor discharge air from upstream of the inlet end passing through the outer air swirler with sufficient swirl strength to recirculate combustion products from downstream of the outlet end into an outer recirculation zone in proximity with the outlet end. An outer fuel injector is mounted proximate to the outer air swirler and is configured and adapted to inject a spray of fuel into the outer recirculation zone.

An inner air swirler is mounted radially inboard of the outer air swirler and outer fuel injector with respect to the central axis. The inner air swirler includes a central cavity defined therein along the central axis. The inner air swirler is configured and adapted to impart swirl to a flow of compressor discharge air from upstream of the inlet end passing through the inner air swirler. The inner air swirler is configured to impart sufficient swirl strength to recirculate combustion products from downstream of the outlet end into an inner recirculation zone radially inboard of the outer recirculation zone and extending into the central cavity. An inner fuel injector is mounted radially outboard of the central cavity of the inner air swirler. The inner fuel injector is configured to inject a spray of fuel through a layer of compressor discharge air from the inner air swirler and into the inner recirculation zone.

In accordance with certain embodiments, the outer fuel injector includes at least one fuel outlet orifice for injecting fuel therefrom, the outer air swirler includes an air outlet for injecting compressor discharge air therefrom, and at least one fuel outlet orifice of the outer fuel injector is radially outboard of the air outlet of the outer air swirler. It is contemplated that in another aspect, the central cavity of the inner air swirler defines a converging diverging flow path. The converging portion of the converging diverging flow path defines a throat of the inner air swirler, which can advantageously be upstream of fuel injection points of the inner fuel injector. The throat of the converging diverging flow path can define a stagnation point in the central cavity, and another stagnation point can be defined at an upstream end of the central cavity. The inner air swirler can include an inlet dome with radial swirl slots defined therethrough for introducing a swirling air flow into the central cavity. It is also contemplated that the recirculation product injection nozzle can include an inner intermediate air passage between the inner air swirler and the inner fuel injector. The inner air swirler can include a radial air swirler defined therethrough in a downstream portion thereof for passage of air from the inner intermediate air passage into the central cavity.

In certain embodiments, the recirculation product injection nozzle includes an outer intermediate air swirler disposed between the outer air swirler and the inner fuel injector. The outer intermediate air swirler can have a diverging outlet configured to direct outlet air from the outer air swirler and the outer intermediate air swirler at a diverging angle with respect to the central axis. The diverging outlet of the outer intermediate air swirler can have an inner surface that is flush with the central cavity of the inner air swirler.

The outer fuel injector can be configured and adapted to inject a spray of fuel in a radially diverging direction with respect to the central axis. The inner fuel injector can be configured and adapted to inject a spray of fuel in a radially convergent direction with respect to the central axis. The nozzle housing can include a fillet shaped downstream surface configured and adapted to direct recirculated combustion products in the outer recirculation zone into a downstream direction. The fillet shaped surface can be formed in the outer fuel injector, or in a downstream facing heat shield of the nozzle housing, for example.

The invention also provides a recirculation product injection nozzle having an outer air swirler ring mounted to a nozzle housing. The outer air swirler ring includes a radial swirler configured to impart swirl to a flow of compressor discharge air from upstream of the inlet end with sufficient swirl strength to recirculate combustion products from downstream of the outlet end into an outer recirculation zone in proximity with the outlet end of the nozzle housing. An outer fuel injector ring is mounted in an insulation cavity of the outer air swirler ring downstream of the radial swirler and is configured and adapted to inject a spray of fuel into the outer recirculation zone downstream of the outlet end. The outer fuel injector ring can inject a small percentage of air to assist atomization and vaporization.

A diffuser ring is mounted radially inboard of the outer air swirler ring. The diffuser ring includes a diverging frusto-conical outlet configured to direct compressor discharge air from the radial swirler of the outer air swirler ring in a diverging direction with respect to the central axis. An inner fuel injector ring is mounted radially inboard of the diffuser ring and has a plurality of inward directed fuel injection ports.

An inner air swirler is mounted radially inboard of the diffuser ring. The inner air swirler includes a central cavity defined therein along the central axis. The inner air swirler is configured and adapted to recirculate combustion products as described above. The inner air swirler includes a plurality of apertures, each having a respective fuel injection port of the inner fuel injector ring proximate thereto for injecting fuel through a layer of compressor discharge air from the inner air swirler into the inner recirculation zone.

The invention also provides a combustion system for a gas turbine engine. The combustion system includes an annular combustor body having an upstream wall with opposed radially inner and outer walls extending therefrom with a downstream opening between the radially inner and outer walls opposite the upstream wall for delivering combustion products to a turbine. The upstream wall includes a plurality of injector ports. A plurality of injectors are included, each mounted to a respective injector port of the combustor body. Each injector has a fuel inlet, an injector feed arm extending from the fuel inlet, and a recirculation product injection nozzle as described above connected to the feed arm in fluid communication with the fuel inlet for injecting fuel and compressor discharge air into the combustor body. In certain embodiments, the combustor body and injectors are configured and adapted to introduce substantially all of the fuel and compressor discharge air into the combustor body through the injectors.

The invention also provides a method of supplying a stream of combustion products to a turbine in a gas turbine engine. The method includes forming an outer recirculation zone of recirculating combustion products within a combustor and forming an inner recirculation zone inboard of the outer recirculation zone. The inner and outer recirculation zones are formed by imparting swirl to compressor discharge air passing through an outer air swirler and an inner air swirler radially inboard of the outer air swirler. The method also includes injecting fuel from an outer fuel injector into the outer recirculation zone, and injecting fuel from an inner fuel injector into the inner recirculation zone.

In certain embodiments, the step of injecting fuel from an inner fuel injector includes injecting fuel through a layer of swirling compressor discharge air between the inner fuel injector and the inner recirculation zone. The step of injecting fuel from an outer fuel injector can include injecting fuel in a direction away from compressor discharge air from the outer air swirler and into the outer recirculation zone.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2 is a cut away perspective view of a portion of the combustion system of FIG. 1, showing one of the recirculation product injection nozzles;

FIG. 3 is a cut away perspective view of a portion of the recirculation product injection nozzle of FIG. 2, showing the fuel passages in the feed arm connecting to the nozzle body;

FIG. 7b is a cross-sectional side elevation view of a portion of the combustion system of FIG. 7a, showing an enlargement of the flow patterns in the central cavity shown in FIG. 7a;

FIG. 8 is a cross-sectional side elevation view of a portion of the recirculation product injection nozzle of FIG. 4, showing the outlet angles of the fuel and air circuits of the nozzle body;

DETAILED DESCRIPTION OF THE PREFERRED EMBODIMENTS

Figure 1:
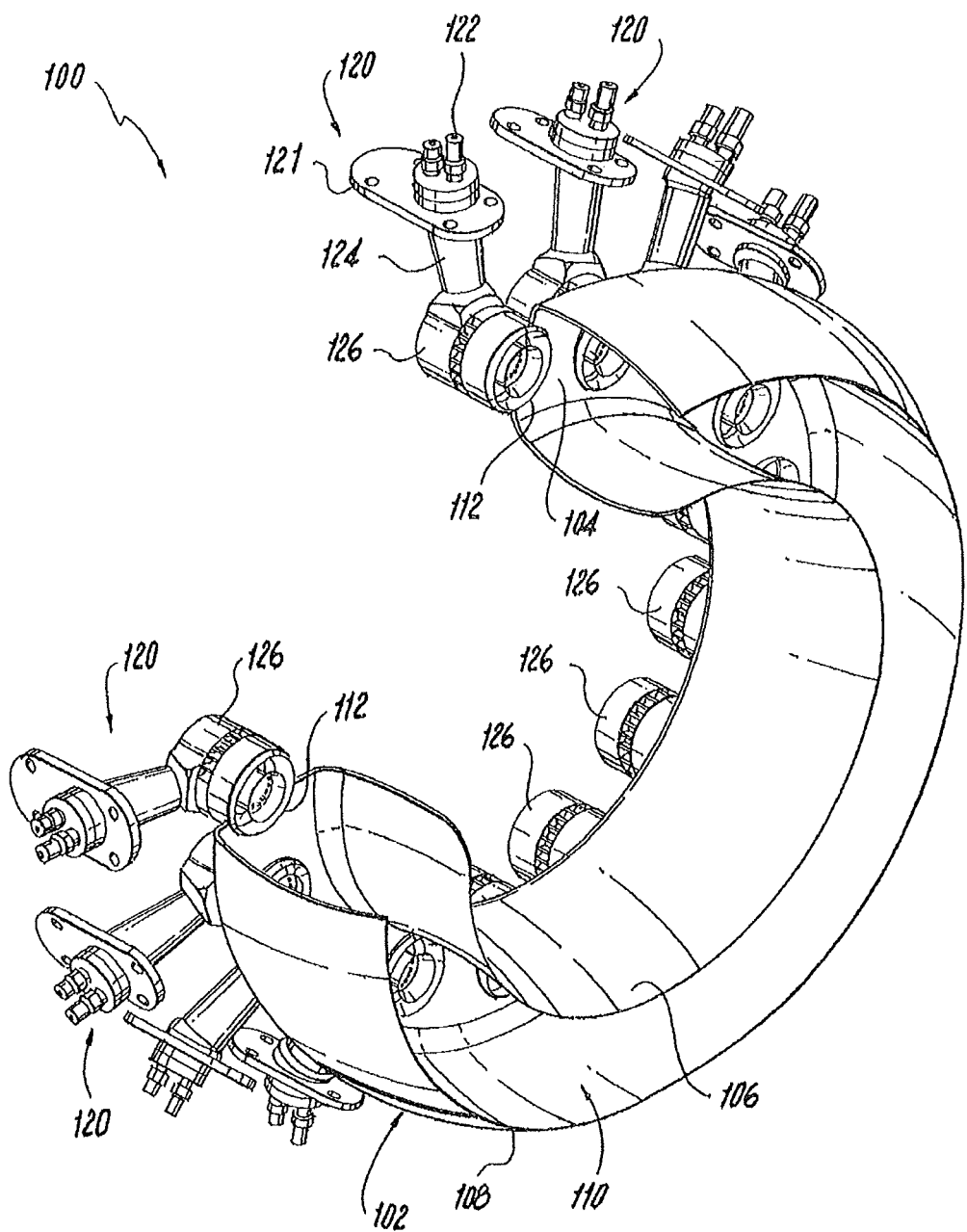
FIG. 1 is a cut away perspective view of an exemplary embodiment of a combustion system constructed in accordance with the present invention, showing a combustor with a plurality of recirculation product injection nozzles affixed thereto for injecting fuel and air.

Reference will now be made to the drawings wherein like reference numerals identify similar structural features or aspects of the subject invention. For purposes of explanation and illustration, and not limitation, a partial view of an exemplary embodiment of a combustion system in accordance with the invention is shown in FIG. 1 and is designated generally by reference character 100. Other embodiments of combustion systems in accordance with the invention, or aspects thereof, are provided in FIGS. 2-12, as will be described. The systems of the invention can be used to inject and combust fuel and air in a distributed manner using recirculated combustion products to improve emissions and lean burn stability for gas turbine engines and the like.

Aero gas turbine engines have progressively been designed to operate at leaner fuel-to-air ratios in order to reduce emissions of $NO_X$, and at higher pressure to increase efficiency. The trend toward higher pressure, lean combustion has been impeded by operability concerns. Very lean combustion has proven to be unstable and generally not well suited for aircraft engines. Alternatively, a very stable form of combustion has been used in industrial furnaces in Europe, operating at very lean conditions with fuel reacting with a very high temperature oxidizer at very high levels of turbulence in a distributed reaction zone. This form of distributed combustion has very high turbulence levels; so high, that if operated in the more common diffusion flame mode (typical of conventional gas turbine combustors) the heat and reactive free radicals would be so rapidly and widely dispersed that the combustion would be unstable at lean conditions likely resulting in flame blowout. When oxidizer temperatures are very high, near auto-ignition temperatures of the fuel-air mixture, reaction rates increase sufficiently to sustain combustion despite extremely high turbulence levels. However, the ratio of turbulent mixing to reaction rates must remain high to produce very stable distributed, reaction with low Damköhler (Da) number, where Da=characteristic_flow_time/characteristic_chemical_time. This Da number is far less than one (Da<<1) when mixing rates are much greater than chemical reaction rates.

Low Damköhler distributed reaction occurs more readily for lean fuel-to-air ratios due to the fact that auto-ignition delay time is inversely proportional to equivalence ratio: as equivalence ratio decreases auto-ignition delay time increases. The increased auto-ignition delay effectively slows the initialization of the chemical reaction. At the same time lower equivalence ratios lead to lower heat release. In general, greater levels of heat release reduce the strength of swirl used in all gas turbine combustors to stabilize the flame. As equivalence ratio decreases so does the heat release allowing for greater swirl and consequently faster mixing rates. As equivalence ratio decreases so do chemical reaction rates while mixing rates increase lending toward low Damköhler number combustion.

Traditional premix or direct lean injection systems do not reach a true distributed reaction, but rather stay in the region of wrinkled laminar flames or flamelets in eddies. Although traditional technologies may appear to posses some of the required traits for distributed combustion, they do not simultaneously posses high enough mixing rates or long enough auto-ignition delay times, high oxidizer temperatures, and sufficiently broad and homogenous fuel-air mixture to achieve a true low Damköhler distributed reaction.

The high turbulence that is required to dissipate coherent flow structures and distribute the flame over a large volume requires the oxidizer temperature to be high to prevent the turbulence from extinguishing the flame by the high turbulent strain. Due to high flame strain and excessive dissipation of combustion radicals, the oxidizer temperature needs to be greater than approximately 1100° K. Such temperatures are significantly higher than typical gas turbine compressor discharge temperatures (T3) for even 40:1 compression ratio gas turbine engines.

The systems and methods of the invention achieve distributed reaction by performing at least the following:

using mostly radial type swirlers to produce strong swirl that generates an inner and outer recirculation zone where combustion gases are circulated along the centerline of swirl and the combustor walls respectively;

recirculating combustion gases upstream of fuel injection to dilute and further heat compressor discharge air prior to mixing with fuel;

having both the pilot and main fuel (or inner and outer fuel) injected at multiple sites away from or through partial compressor air, into both the inner and outer recirculation zones of hot combustion gases where it is heated, vaporized, and mixed;

injecting fuel through about 15-40 individual injection sites with sufficient local momentum to atomize, distribute, and mix the fuel with either almost pure recirculated combustion gases or a mixture of combustion gases and air—this extends auto-ignition delay time of the fuel allowing for more homogeneous mixing before reaction occurs, and the large number of injection sites also reduces the mixing length and therefore mixing time; and keeping the temperature rise of the reaction above the inlet temperature at a level less than traditional systems by raising the inlet air to a higher initial temperature—the extended mixing time also leads to a more spatially homogeneous reaction and therefore temperature distribution.

A truly distributed low Damköhler number reaction exhibits many desirable characteristics including high combustion efficiency, high stability levels with virtually no thermoacoustic instabilities, very low lean stability limits, very low CO concentrations due to efficient and rapid oxidation of CO into $CO_2$, extremely low $NO_X$, virtually zero UHC, and very uniform temperature pattern factor at the combustor exit.

Distributed reactions are very stable for at least two reasons: the reactions are distributed volumetrically (not as in surface flames like wrinkled laminar flames or flamelets in eddies), and there is no single point of combustion initiation. The first reason for the decreased tendency of the flame to become unstable is that the reactions are distributed, meaning that when the combustion is distributed the heat release is uniform and the size of the region of heat release is a substantial part of the entire combustion chamber. This distributed reaction makes it more difficult for the heat release to couple with the acoustics and form thermo-acoustic instabilities. When the turbulence becomes sufficiently high to diffuse the chemical gradients and to make the reactions distributed (as in a well stirred reactor) any momentum gradients that may exist are also diffused by the same turbulent mixing. In this randomly diffusive turbulent process, the coherent unsteady flow structures such as shed vortices are dissipated quickly. Most combustion instabilities in traditional systems involve a three part cyclic process, where some fluid mechanics process results in a fluctuation in heat release rate that couples and reinforces an acoustic mode that trips the unstable fluid dynamic structure, and so forth. But in distributed reactions, such coupling does not occur. The inability of this type of coupling to occur inhibits strong acoustic waves that could otherwise damage the combustor or turbine blades.

Distributed combustion also results in a substantially more homogeneous temperature distribution across the combustor than in systems with wrinkled laminar flames or flamelets in eddies. This is due to the completion of combustion prior to encountering the turbine and the lack of local combustion pockets being significantly richer or leaner than the average. An even temperature distribution reduces wear on turbine blades since there are no high temperature streaks, and little to no temperature gradient at the turbine inlet allows for higher turbine efficiency.

The systems and methods of the invention provide a means of mixing fuel and oxidizer through a unique and indirect process in order to meet the requirements of distributed combustion in a gas turbine engine combustor. The primary requirements to obtain stable distributed combustion are high temperature oxidation and sufficiently rapid mixing such that distributed oxidization occurs without a discrete flame front. The temperature required, about 1100° K or greater, exceeds compressor discharge temperature (T3) for typical gas turbine engines. This invention includes a device for mixing compressor air with combustion gases to reduce oxidizer concentration and to increase oxidizer temperature such that volumetric distributed combustion occurs at very lean fuel-air mixtures. The device achieves mixing of inlet oxidizer and recirculated combustion gases within the confines of the combustor and fuel nozzle section of a gas turbine engine without the need for auxiliary ducting or large heat exchangers common in industrial process applications, and without needing to include a more unconventional reverse flow style combustor in a gas turbine engine.

Traditional devices in the field primarily utilize swirl to establish an aerodynamic stagnation point within the combustor flow field as a flame anchor. In the methods and systems of the subject invention, flame anchoring is a secondary function that is only utilized at equivalence ratios above which the distributed reaction occurs. The inventive device described herein primarily uses the swirl as a means of pumping large amounts of combustion products upstream of the fuel injection and internal to the device to be mixed with and heat the compressor air to sufficiently high temperatures as to promote stable, volumetric, distributed reaction. A lip on the exit of the nozzle protruding aft from the most forward part of the combustion chamber in conjunction with the strong swirl also generates a significant outer recirculation zone of hot combustion gases that is greater in volume than that of the central/internal recirculation zone and important to achieving rapid homogeneous distribution of fuel. To aid in homogeneous distribution of fuel, two fuel circuits exist, an inner fuel circuit and an outer fuel circuit, each having of a plurality of injection sites to reduce mixing lengths. Mixing between the inlet air and combustion products prior to fuel injection also results in a more dilute mixture of oxidizer with products that creates a leaner combustion environment extending auto-ignition delay of the reaction.

The following is an overview of how the combustion system of the present invention differs from conventional and modern lean burn technologies. Conventional combustion systems have a rich primary zone, ended by addition of large amounts of dilution air through the combustor liner, followed by a secondary lean combustion zone. Film cooling air is also introduced through many small holes perforating the majority of the combustor wall. A traditional lean burn combustor does not have any dilution holes, but typically still has film cooling. In traditional lean burn systems, the majority of air passes through the fuel/air injector at the forward end the combustor (significantly more air than a conventional combustor). Fuel is typically premixed or partially premixed with the compressor air before entering the combustor and reacting. In both conventional systems and traditional lean burn systems, the outer most circuit on the injection device is an air passage or there is an outer air passage enveloping the device but integral to the combustor dome. The combustion system of the present invention differs significantly. It is configured to pass substantially 100% of the combustion air through the injectors, although film cooling may still be used as method to cool the combustor wall, auxiliary combustion air is not necessarily desirable for operation. The outer most passages of the nozzles of the present invention are for fuel injection, referred to as the main or outer fuel circuit, with no additional air passages in the dome. This means that the fuel is injected into the outer recirculation zone as opposed to mixing with air as in conventional systems or traditional lean burn systems. The pilot or inner fuel circuit is similar, injecting fuel into an inner core recirculation zone. Both of these fuel circuits will be discussed in more detail below.

Recirculation of the combustion gases is an important feature of the systems of the subject invention, as well as mixing of recirculated combustion gases with compressor air prior to fuel injection. To maintain the strong swirl required, the system implements multiple radial air swirlers. Some conventional lean injection devices utilize a single radial swirler as the outer most air passage, but do not use additional radial swirlers due to packaging difficulties. They instead rely on axial or discrete jet swirlers that have high discharge coefficients but offer weaker tangential momentum to the air. The system of the subject invention uses a design that allows implementation of a greater number of radial swirlers to improve swirl strength over conventional devices without requiring a higher air pressure drop between P3 and P4, i.e., pressure drop through the length of the combustor, than that of conventional systems or traditional lean burn systems.

Another level on which the subject invention differs from conventional systems and traditional lean burn systems is on the injector level. Air/fuel injection devices for gas turbine engine combustors use swirl to establish an aerodynamic stagnation point near the upstream end of the combustor for flame stabilization combustion. In conventional systems and traditional lean burn systems, this stagnation point provides a single anchor point from which the flame propagates. A typical air-blast injector has a center axial swirler with a small center hub along the centerline of the swirling flow. A stagnation point is established at the exit of the central swirl channel. However, pressure oscillations caused by combustion or aerodynamic instabilities can easily temporarily shift this stagnation point inside or outside the swirling channel. Typical air-blast style injectors have a relatively low pressure drop at the site of fuel injection. With the close proximity of the stagnation point to fuel injection and the low fuel pressure drop, small oscillations in the stagnation point position (and therefore the local pressure field) also make this style of pilot susceptible to coupling of thermo-acoustic instabilities.

Another traditional lean-burn pilot approach utilizes the basic concept of an axial swirler with a single pressure atomizer instead of the swirler center hub. To enhance stability, the pressure atomizer tip is followed by a small convergent-divergent section. The aerodynamic stagnation point is established at the throat of the convergent-divergent section, downstream of the fuel pressure atomizer. The convergent-divergent section helps in vortex stabilization, however, the fuel injection site is in close proximity to the aerodynamic stagnation point. In this case the stagnation point is also somewhat susceptible to oscillations in pressure or heat release and is still vulnerable to the instabilities described above. In the injectors of the subject invention, the fuel is injected downstream of the primary stagnation point, as described in greater detail below.

In summary the systems and methods of the subject invention rely on three key elements, namely:
- a strong swirl induced by high swirl number axial swirlers and/or radial swirlers that act as a pump to generate a recirculation ratio of hot combustion products upstream of fuel injection to mix with, dilute, and heat compressor discharge air, with both inner and outer recirculation zones established in order to achieve rapid homogeneous mixing of fuel, combustion products, and oxidizer;
- preparation and injection of fuel, including quantity of injection sites, orientation, and position to encourage a wide spread homogenous mixture of fuel-combustion product, and later oxidizer through direct injection of fuel into the combustion product gases; and
- a hollow upstream swirl chamber followed by a convergent-divergent section that is configured to interact with compressor discharge air to entrain hot combustion gases and mix with compressor discharge air in addition to stabilizing one to two forward aerodynamic stagnation points.

Referring now to FIG. 1, combustion system 100, constructed in accordance with the subject invention, includes a combustor 102 that is a generally annular body and has an upstream wall 104 with opposed radially inner and outer walls, 106 and 108, respectively, extending therefrom with a downstream opening 110 between the radially inner and outer walls 106 and 108 opposite upstream wall 104 for delivering combustion products, for example, to a turbine downstream of combustor 102. Upstream wall 104 includes a plurality of injector ports 112. A plurality of injectors 120 are included, each mounted to a respective injector port 112 of combustor 102. Each injector 120 has a fuel inlet 122, an injector feed arm 124 extending from fuel inlet 122, and a recirculation product injection nozzle 126 (hereinafter RPI nozzle 126) connected to feed arm 124 in fluid communication with the respective fuel inlet 122 for injecting fuel and compressor discharge air into combustor 102. When mounted in an engine, each injector 120 is mounted by flange 121 of feed arm 124 to a combustor housing or other suitable mount (not shown). In FIG. 1, not all of the injector 120 are labeled with reference characters for sake of clarity. Aside from the plurality of injector ports 112 and the downstream opening 110, combustor 102 is devoid of openings. Combustor 102 and injectors 120 are thus configured and adapted to introduce substantially all of the fuel and compressor discharge air into combustor 102 through the injectors 120, i.e., there are no perforations through the walls of combustor 102 for cooling air, intermediate air, dilution air, or the like. However, those skilled in the art will readily appreciate that wall cooling air can be included without departing from the spirit and scope of the invention.

Referring now to FIG. 2, one of the injectors 120 of combustion system 100 is shown in greater detail, with a portion of combustor 102 cut away to show the connection of injector 120 thereto through injector port 112. Injector 120 includes RPI nozzle 126, which has a generally ring shaped nozzle housing 128 having an inlet end 130 and opposed outlet end 132. Nozzle housing 128 defines a central axis A along the direction extending from inlet end 130 to outlet end 132. An outer air swirler 134 is mounted to nozzle housing 128. Outer air swirler 134 is generally ring shaped and includes radially off set swirl ports 135 for introducing compressor discharge air from outside nozzle housing 128 therethrough.

Referring now to FIG. 3, an outer fuel injector 136, in the form of a ring, is mounted to nozzle housing 128 proximate to outer air swirler 134 for injecting fuel into combustion system 100 as described in greater detail below. Outer fuel injector ring 136 is mounted in an insulation cavity in the downstream portion of the ring of outer air swirler 134, downstream of the radial swirler thereof. Outer fuel conduit 138 conveys fuel from inlet 122 (shown in FIG. 2) through feed arm 124 to supply fuel to outer fuel injector 136. Fuel passes from outer fuel conduit 138 to outer fuel injector 136 by way of axial fuel conduits 140 and fixture 142 connecting between conduit 138 and conduits 140. As can be seen by comparing FIGS. 2 and 3, there are no radial swirler slots through outer air swirler 134 adjacent to conduits 140.

Figure 4:
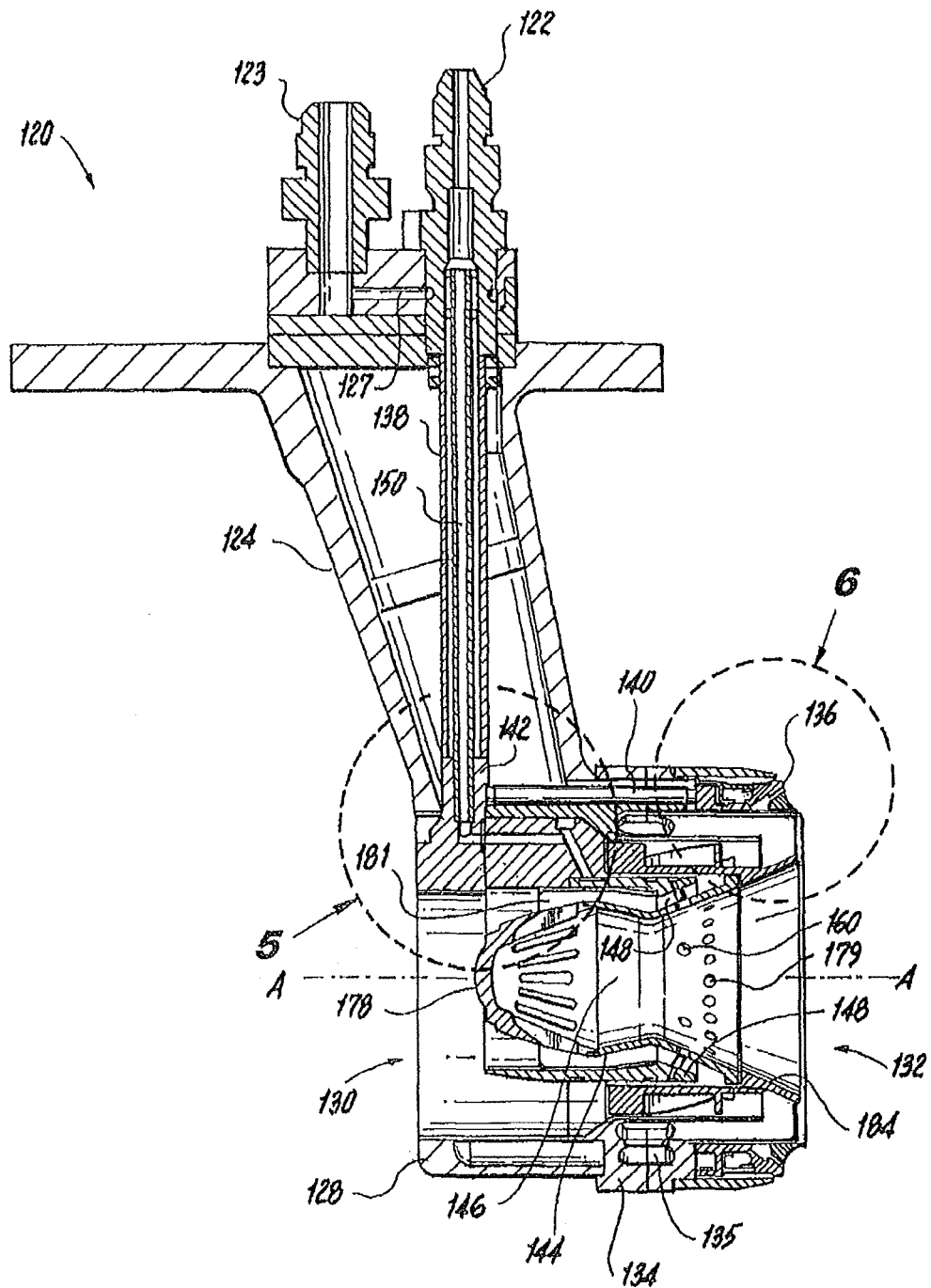
FIG. 4 is a cross-sectional side elevation view of the recirculation product injection nozzle of FIG. 2, showing the air and fuel circuits of the nozzle body.

With reference now to FIG. 4, an inner air swirler 144 is mounted radially inboard of outer air swirler 134 and outer fuel injector 136 with respect the central axis A. Inner air swirler 144 includes a central cavity 146 defined therein along central axis A. An inner fuel injector 148 is mounted radially outboard of central cavity 146 of inner air swirler 144. Inner fuel injector 148 is generally ring shaped and is mounted radially inboard of the diffuser ring of frustoconical tip 184, which is described below Inner fuel injector 148 has a plurality of inward directed fuel injection ports 156 which protrude through an inner intermediate air passage 181, described in greater detail below, to issue fuel through injection ports 160 of inner air swirler 144 into central cavity 146.

Figure 5:
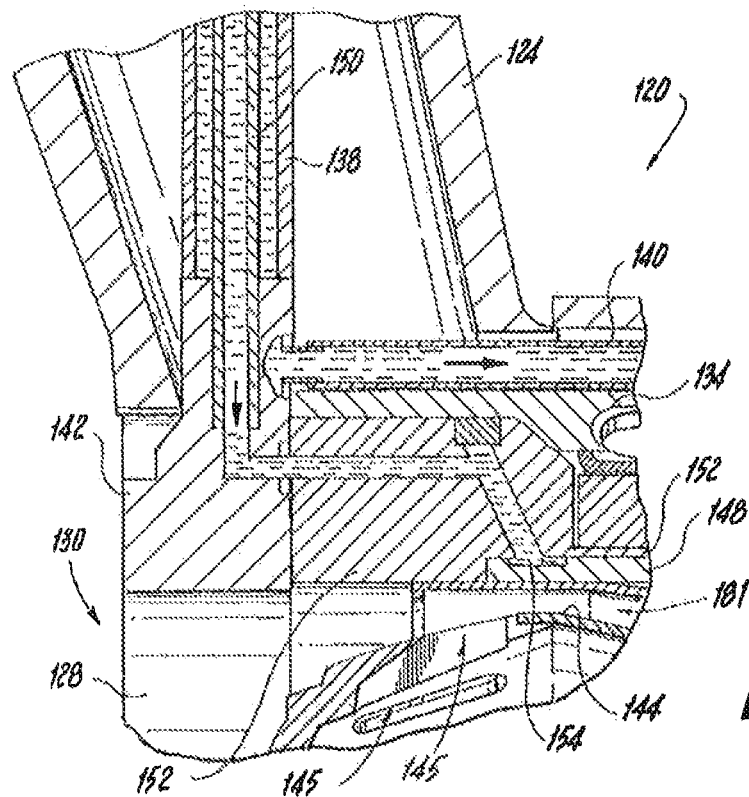
FIG. 5 is a cross-sectional side elevation view of a portion of the recirculation product injection nozzle of FIG. 4, showing the passage of fuel from the feed arm into the inner and outer fuel circuits of the nozzle body.
Figure 6:
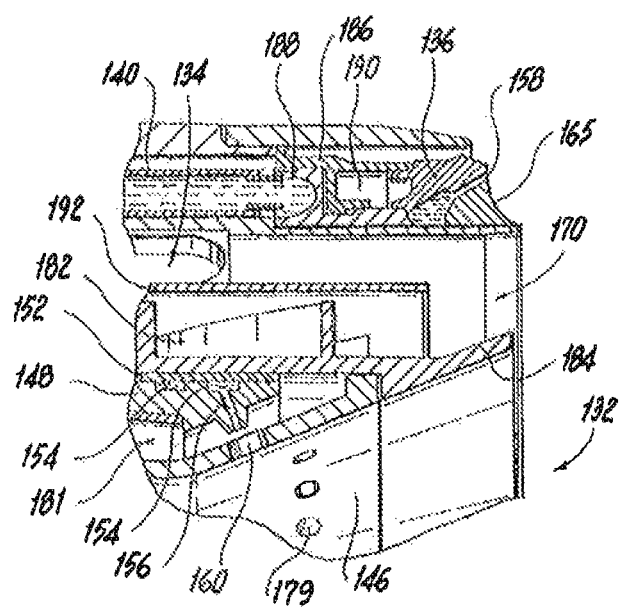
FIG. 6 is a cross-sectional side elevation view of a portion of the recirculation product injection nozzle of FIG. 4, showing the downstream portions of the inner and outer fuel circuits.

With reference now to FIGS. 4, 5 and 6, the fuel circuits of nozzle body 128 are shown proximate inlet end 130 and outlet end 132, respectively. The first fuel circuit runs from fuel inlet 123, into outer fuel conduit 138 through a fuel passage 127 into fuel inlet 122 (see FIG. 4), though fixture 142 and on through axial fuel conduits 140, one of which is shown in cross-section, out of plane with the main cross-section of FIGS. 5 and 6, and finally into outer fuel injector 136, as shown in FIG. 6. The fuel of the first fuel circuit is injected from outer fuel injector 136 through orifices 158. There are sixteen orifices 158, however, those skilled in the art will readily appreciate that any suitable number of orifices can be used. Fuel passages rings 186 and 188 form a portion of the outer fuel circuit, and also form an insulation gap 190 for thermal isolation of fuel in the outer fuel circuit from external conditions.

The second fuel circuit runs from fuel inlet 122, shown in FIG. 4, into inner fuel conduit 150. The second fuel circuit conveys fuel to the outlet orifices 156 of inner fuel injector 148, shown in FIG. 6, by way of fixture 142, inner fuel fixture 152, through inner fuel passages 154 defined between the outboard surface of inner fuel injector 148 and the inner surface of inner fuel fixture 152. As shown in FIG. 6, each orifice 156 includes a protrusion that extends across inner intermediate air passage 181, with a small gap between the corresponding port 160 and the protrusion for passage of air to assist with injection of fuel from the orifice 156. There are six orifices 156 in RPI nozzle 126, however, it is contemplated that between about 15-40 total injection points can be used for the inner and outer fuel circuits. Those skilled in the art will readily appreciate that any suitable number of injection points can be used without departing from the spirit and scope of the invention.

Figure 7A:
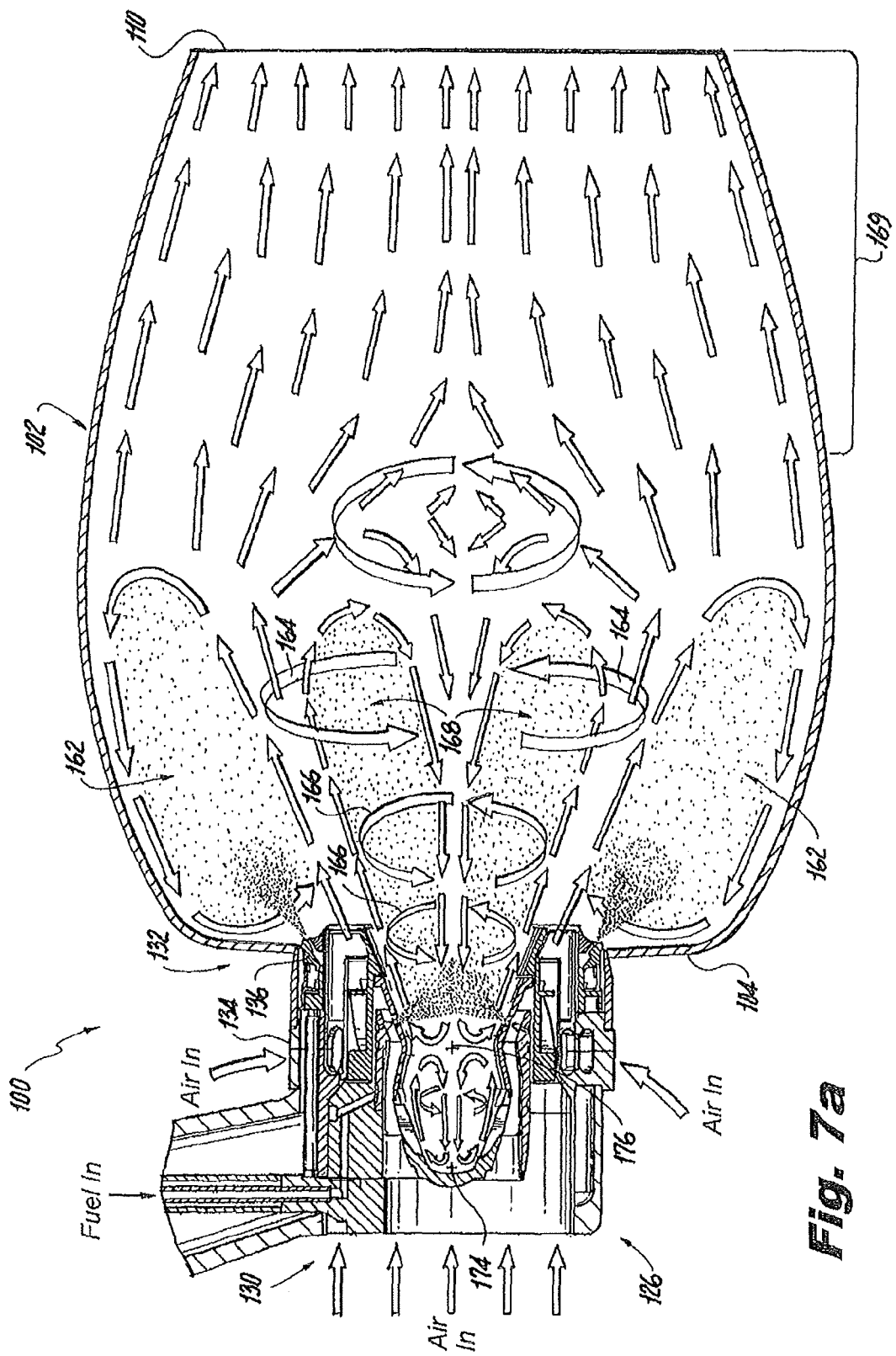
FIG. 7a is a cross-sectional side elevation view of a portion of the combustion system of FIG. 2, schematically showing the fuel and air flow patterns in the recirculation product injection nozzle and in the combustor.
Figure 7B:
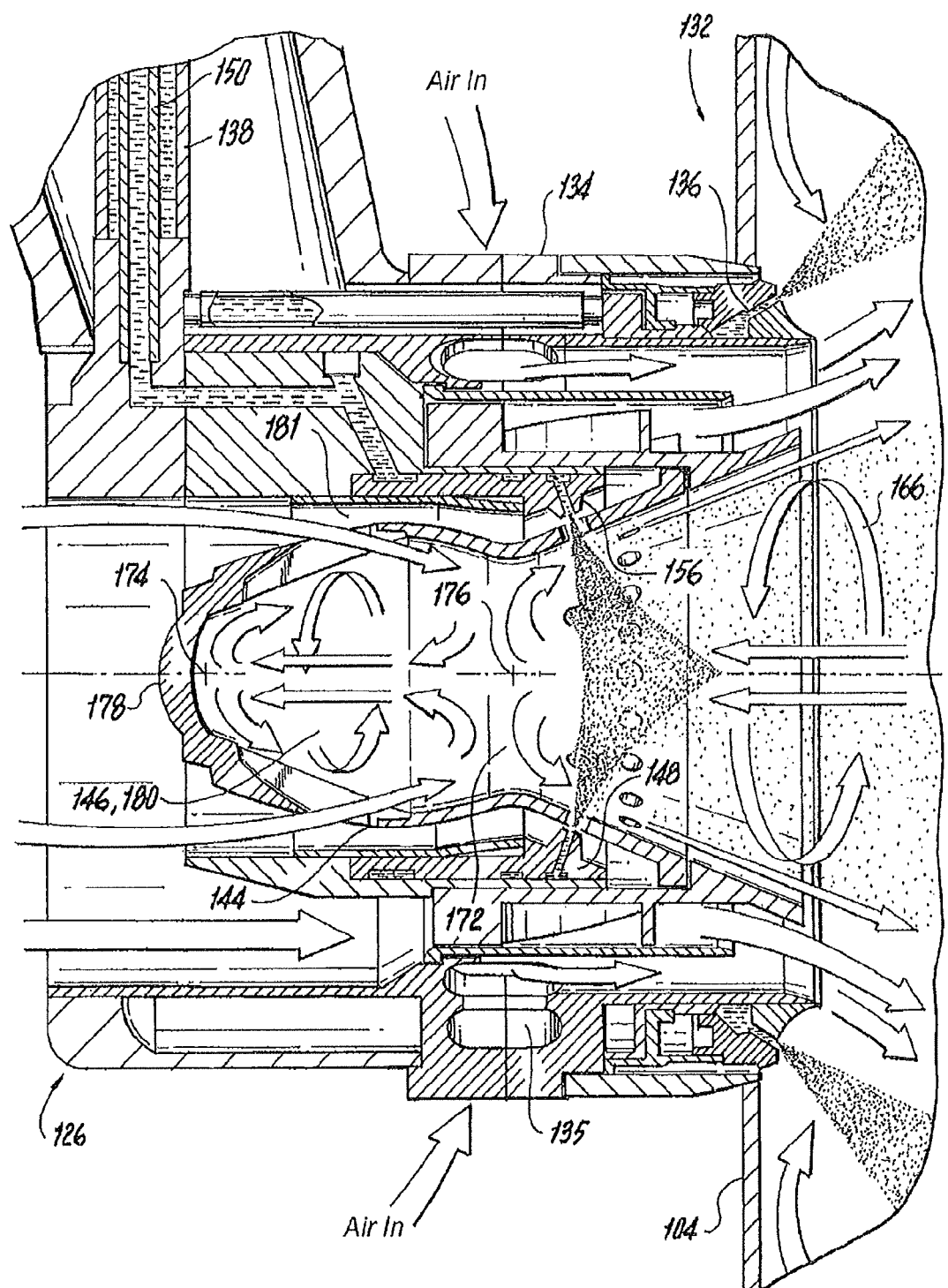

Referring now to FIGS. 7a and 7b, the fuel and air flow patterns in combustion system 100 are described in conjunction with the schematic flow patterns indicated by arrows and stippling. Outer air swirler 134 forms an outer air circuit that imparts swirl to a flow of compressor discharge air 164 from upstream of the inlet end 130, which passes through the radial swirl ports 135 of outer air swirler 134 with sufficient swirl strength to recirculate combustion products from downstream of outlet end 132 into an outer recirculation zone 162 in proximity with outlet end 132. Outer recirculation zone 162 is generally toroidal, with upper and lower cross-sections shown schematically by the arrows in FIG. 7a. The high swirl velocity of compressor discharge air 164 from outer air swirler 134 creates a low pressure zone that pulls downstream combustion products back toward outlet end 132 of RPI nozzle 126. The filleted downstream face 165 of outer fuel injector 136 (see FIG. 6) aids in formation of the recirculating pattern of outer recirculation zone 162, directing the returning flow of combustion products back downstream. The downstream extent of face 165 forms a lip on the exit of RPI nozzle 126 that protrudes downstream of upstream wall 104 of combustor 102. This lip, in conjunction with the strong swirl, helps generate outer recirculation zone 162, and helps outer recirculation zone 162 have a greater volume than that of the inner recirculation zone 168, which is described below. The lip is therefore also important to achieving rapid homogeneous distribution of fuel. Outer fuel injector 136 injects a spray of fuel into outer recirculation zone 162, where temperatures and turbulent mixing are conducive to distributed combustion.

Inner air swirler 144 forms an inner air circuit that imparts swirl to an inner flow of compressor discharge air 166 from upstream of inlet end 130. This inner flow of compressor discharge air 166 passes through the upstream swirl slots 145 (labeled in FIG. 5) of inner air swirler 144 with sufficient swirl velocity to create a low pressure zone that pulls downstream combustion products back toward outlet end 132 of RPI nozzle 126, resulting in the formation of inner recirculation zone 168. Inner recirculation zone 168 is generally toroidal and resides within the center space, i.e., radially inboard, of outer recirculation zone 162, and is concentric therewith. Inner air swirler 144 imparts sufficient swirl strength to extend part of inner recirculation zone 168 in the upstream direction into central cavity 146 of inner air swirler 144. Inner fuel injector 148 injects a spray of fuel through orifices 156 and through the layer of compressor discharge air 166 and into inner recirculation zone 168. Downstream of inner and outer recirculation zones 168 and 162 is a distributed reaction region 169, flowing towards opening 110 of combustor 102.

With reference now to FIG. 8, the exit angles of the fuel and air circuits of injector 120 are shown, with fuel exit angles represented by dark arrows, and air exit angles represented by light arrows. FIG. 8 shows important relationships between the velocity vectors of the fuel and air injection for both the first and second fuel circuits described above. Only the magnitude of the combined axial and radial velocity component is shown, and it is important to note there is still a tangential, or circumferential, component to the flow field. As shown in FIG. 8, $\phi_O$ is the angle to the shear layer formed between the outer most air injection from outer air injector 134 and the recirculation combustion gases in outer recirculation zone 162, and is measured from central axis A. $\theta_M$ is the angle from central axis A to the centerline of fuel injection from outer fuel injector 136. The fuel outlet orifices 158 of outer fuel injector 136 are radially outboard of the air outlet 170 of outer air swirler 134. Thus $\Omega_M$ is the greatest angle from central axis A for which the centerline of the injected fuel from outer fuel injector 136 will intersect the $\phi_O$ vector of the outer air/recirculation gas shear layer, prior to hitting outer wall 108 of combustor 102.

This does not imply that the fuel will physically impinge upon the combustor wall but rather that any greater angle of $\theta_M$ would result in no intersection between the centerline of the fuel with the line of the shear layer represented by the $\phi_O$ vector. The value for $\theta_M$ can thus be in the range of $0° \leq \theta_M \leq \Omega_M$ with respect to axis A. It is desired for the fuel to mix with combustion products prior to mixing fuel with the oxidizer, but if $\theta_M$ is too great, then the fuel may impinge on wall 108 or be trapped too long in outer recirculation zone 162, resulting in soot formation. Therefore, it is desired that the fuel have some interaction with the shear layer to aid in the eventual mixing of fuel with oxidizer. A lean burn or conventional injection device injects the main or outer fuel directly into an air stream for fuel/oxidizer mixing. It can be appreciated by those skilled in the art that RPI nozzle 126 provides the intermediate step of mixing the fuel from outer fuel injector 136 with recirculated combustion gases prior to introducing the fuel to a mixture of oxidizer and combustion gases.

The injection of fuel from inner fuel swirler 148 operates with similar principles as that described above for the outer fuel injection but differs slightly based upon constraints for the required air effective area of RPI nozzle 126. In order to meet the requirements for air effective area pertaining to engine power, for example, some air injection must be done upstream and closer to the centerline than the pilot fuel injection. This forces compressor discharge air to pass over inner fuel injection ports 160 defined through inner air swirler 144. It would be undesirable for the fuel and compressor discharge air to undergo substantial mixing at fuel injection ports 160, given the desire for achieving a distributed reaction. To overcome this problem the inner fuel is injected substantially inward radially and substantially perpendicular to the inner airflow in order to cross the airflow and enter into inner recirculation zone 168 of combustion gases. Though some inner fuel will be lost to the compressor discharge airflow on its way into inner recirculation zone 168, the fuel momentum is such that a sufficient quantity of inner fuel penetrates into inner recirculation zone 168 as to preserve the fuel recirculation gas mixing. In FIG. 8, $\phi_C$ is the angle between central axis A of flow rotation and the outer angle of inner air flow exiting inner air swirler 144. Inner air swirler 144 imparts sufficient outward radial momentum that the air flow follows the wall of the device's inner divergent section. The value for $\phi_C$ is in the range of about $0° \leq \phi_C \leq 60°$. The angle $\theta_P$ is measured from $\phi_C$ to the center of the fuel injection spray from inner fuel injector 148. The fuel is injected toward central axis A, converging toward the axis of flow rotation. The value for $\theta_P$ is in the range of about $-45° < \theta_P \leq \phi_C + 45°$.

RPI nozzle 126 thus distributes fuel and air, metering the flow of large amounts of air and fuel without initially mixing them directly. Both the inner and outer fuel circuits may use a small amount of compressor air co-injected with the fuel at the injection site to aid in mixing and atomization. This can be accomplished with air injected co-centrically around the outer and inner fuel injectors 136 and 148 as an aid to fuel mixing and atomization. It is also possible to include small premix chambers in which a small portion of the oxidizer is premixed with a portion or all of the fuel as an aid to fuel mixing and atomization. Such premix chambers can be formed to produce cylindrical, conical, rectangular, or any other suitable shape of jet of mixed fuel and oxidizer. Such premix chambers are discussed in greater detail in U.S. Provisional Patent Application No. 61/454,356, which is incorporated by reference herein in its entirety.

The total amount of air for all fuel injection sites should not exceed approximately 5% of the total air flow through RPI nozzle 126. In this way the air assist, which comes from compressor discharge air, for the fuel does not generate a stoichiometry condition conducive to premature combustion. The primary function of the air assist is to help atomize, vaporize, mix, and distribute the fuel more quickly into the recirculated combustion gases. Its function is not to generate a premix or partial premix combustible mixture: the mixture should be such that it is significantly above the rich flammability limit. The air assist may also be used to help shape fuel spray. The fuel injection spray from inner and outer fuel injectors 148 and 136 may be a multi-point discrete jet, conic spray, flat-fan spray, or other suitable shape that is conducive to accelerated vaporization and mixing. Since the fuel/air ratio produced by the air assist is not of a combustible mixture it may be premixed with the fuel in a manner to partially or fully vaporize the fuel within the confines of the device, prior to injection into the combustion gases.

An advantage in using multi-point injection ring manifolds for both the inner and the outer fuel circuits is flexibility in fuel staging. Fuel staging can be done in the traditional sense of the primary fuel circuit consisting only of pilot (or inner) injection sites and the secondary fuel circuit consisting of only the main (or outer) injection sites. For the multi-point injection ring, a third circuit can be created by dividing the inner and/or the outer injection ports into two independent sets for increased fuel staging capability. An example would be if the outer fuel circuit has sixteen injection sites it could be divided into two circuits of eight and eight or four and twelve, etc., so that there would be a primary inner fuel circuit, a secondary outer fuel circuit, and a tertiary outer fuel circuit. Fuel staging could also be done by dividing a portion of the each the inner and the outer circuits on a single fuel circuit such that the primary fuel circuit would be composed of a portion of the inner injection sites and a portion of the outer injection sites, while the secondary circuit would be composed of the remaining injection sites. An example would be if the inner injector has six injection sites and the outer injector has sixteen, the primary fuel circuit can include three inner and eight outer injection sites while the secondary fuel circuit includes the remaining injection sites. It can be appreciated that any fuel split could be used such as a primary circuit composed of three inner sites and four outer sites, with the secondary circuit composed of three inner sites and twelve outer sites, or any other combination depending on the number of injection sites per inner circuit and outer circuit, and engine performance requirements.

Referring again to FIG. 7b, the central cavity 146 of the inner air swirler defines a converging diverging flow path, the most converged portion of which forms throat 172. Throat 172 is advantageously located upstream of fuel injection orifices 156 of inner fuel injector 148, as described below in greater detail. Throat 172 of the converging diverging flow path can define a first stagnation point 176 in central cavity 146, and a second stagnation point 174 can be defined at an upstream end of central cavity 146. The inner air swirler includes inlet dome 178 with radial swirl slots 145, labeled in FIG. 5, defined therethrough for introducing a swirling air flow into central cavity 146. Inner intermediate air passage 181 between inner air swirler 144 and inner fuel injector 148 feeds radial air swirler 179 defined therethrough downstream of throat 172 for passage of air from inner intermediate air passage 181 into central cavity 146. Inner intermediate air passage 181 also feeds air jets around ports 160 for atomization assist on the inner fuel circuit. Radial air swirler 179 and ports 160 are both labeled in FIG. 6. This adds to the swirl in the inner air circuit and contributes to supplying the desired amount of compressor discharge air for the desired fuel/air ratio.

The convergent-divergent section of inner air swirler 144 creates two stable stagnation points, namely upstream stagnation point 174, and downstream stagnation point 176. RPI nozzle 126 differs from traditional fuel nozzles in that it uses a radial style swirler, i.e., radial swirler dome 178, injecting air into a hollow core chamber, namely central cavity 146, in place of an axial swirler with a hub or fuel tip in the center that is used in traditional fuel pilot systems. The radial style swirler of swirler dome 178 injects air with little to no initial axial velocity into a swirl chamber that is inside swirler dome 178 and contiguous with central cavity 146. This chamber is then followed by the convergent-divergent section described above.

Upstream stagnation point 174 is a primary stagnation point that is always established at the head wall of the swirl chamber. The air effective area of the radial swirler dome 178 is greater than approximately 70% of the effective area of throat 172, so a secondary stagnation point is established at the throat position, namely downstream stagnation point 176. It is possible to configure the central cavity to have only one stagnation point, such as if the air effective area of the radial swirler dome 178 is significantly less than about 70% of the effective area of throat 172, in which case flow can travel upstream and only stagnation point 174 persists. The two-stagnation point flow condition is desirable partially because it places two stagnation points upstream of the fuel injection sites of inner fuel injector 148. Upstream stagnation point 174 near the wall of dome 178 is very stable since this point is relatively isolated from small pressure oscillations in combustor 102 far downstream. The recirculating flow in upstream zone 180 within central cavity 146 also helps pull downstream stagnation point 176 back into place if it is perturbed by downstream fluctuations. Likewise, the recirculation downstream of throat 172 pulls stagnation point 176 back to throat 172 if perturbed from upstream. With this configuration, the stability of the stagnation points 174 and 176 is greater than that of traditional fuel nozzles.

RPI nozzle 126 operates in both distributed combustion, and in traditional lean combustion, depending on the desired power level, e.g., operating in distributed combustion at lower power levels. The fuel from inner fuel injector 148 is injected at multiple locations with a fuel pressure drop at each injection orifice 156 (see FIG. 6) similar to typical pressure atomizers. The locations of pilot fuel injection orifices 156 are considerably downstream of stagnation points 174 and 176 compared to traditional nozzles. This means that during lean burn operation (equivalence ratios less than 1.0) the fuel is less susceptible to aerodynamic perturbations and therefore less prone to thermo-acoustic coupling. When the device is operating within an envelope of distributed reaction and very lean (equivalence ratio approximately less than 0.5) the combustion stability is not dependent upon the stagnation point (s). This is because the combustion reaction occurs in a volumetric fashion and does not propagate from the aerodynamic stagnation point, resulting in a far more stable operation at very lean fuel/air ratios compared to traditional lean burn devices. The lower limit on fuel/air ratio is lean burn out, which varies with conditions.

Referring again to FIG. 6, an outer intermediate air swirler 182 is disposed between outer air swirler 134 and the inner fuel injector 148. This outer intermediate air swirler 182 has a diverging outlet defined by the radially outer surface of frustoconical tip 184, which is a diffuser ring configured to direct outlet air from outer air swirler 134 and outer intermediate air swirler 182 at a diverging angle $\phi_f$, labeled in FIG. 8 with respect to the central axis A. The interior surface of frustoconical tip 184 forms a diverging outlet of inner air swirler 144 that is substantially flush with central cavity 146. A separator sleeve or guide ring 192 separates the outer air flow passage of outer air swirler 134 from the outer intermediate air flow passage of intermediate air swirler 182 until just upstream of outlet 170, which these two air flow passages share in common.

Figure 9:
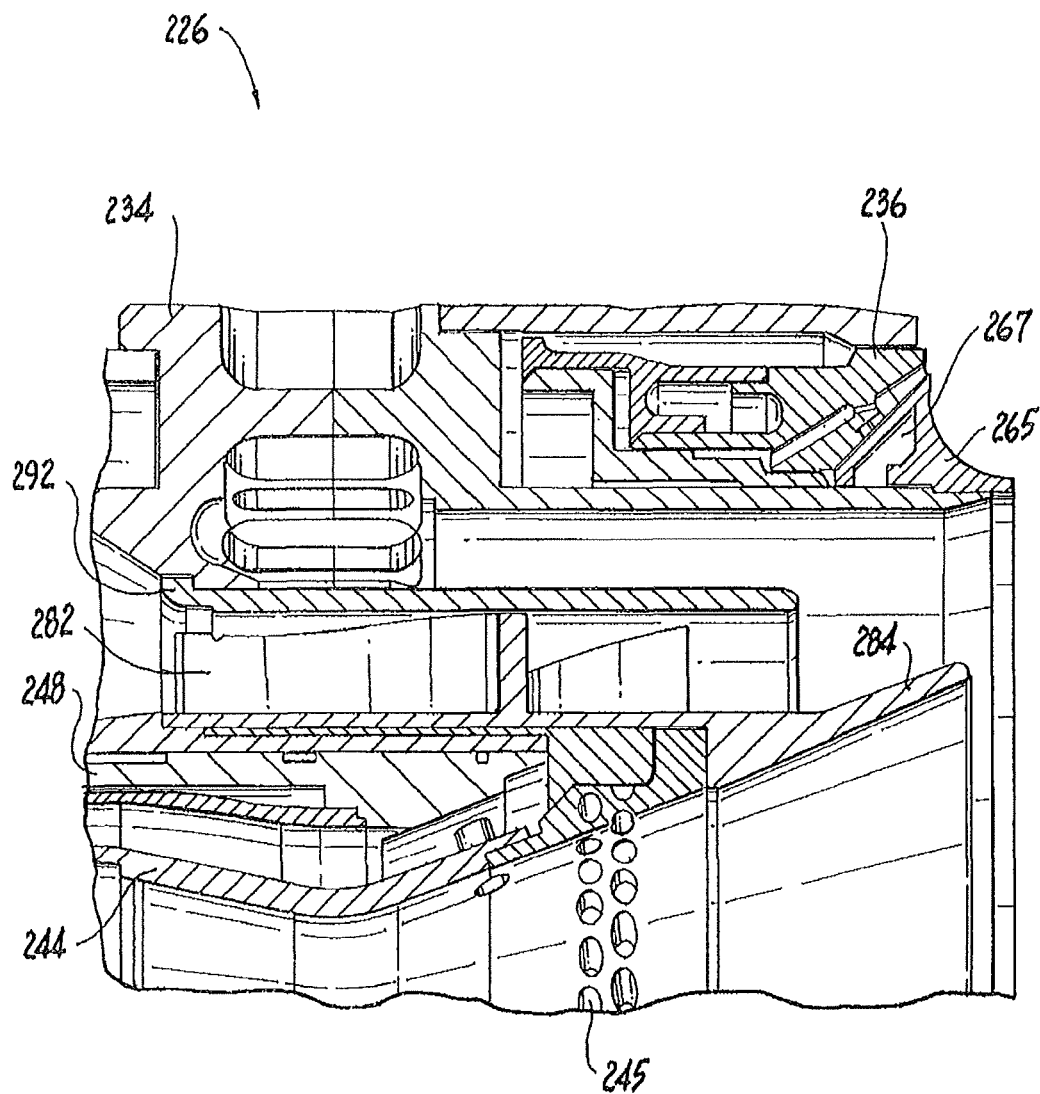
FIG. 9 is a cross-sectional side elevation view of a portion of another exemplary embodiment of a recirculation product injection nozzle constructed in accordance with the present invention, showing the outlet portion of the nozzle with a filleted, downstream facing heat shield covering the outer fuel injector ring.
Figure 10:
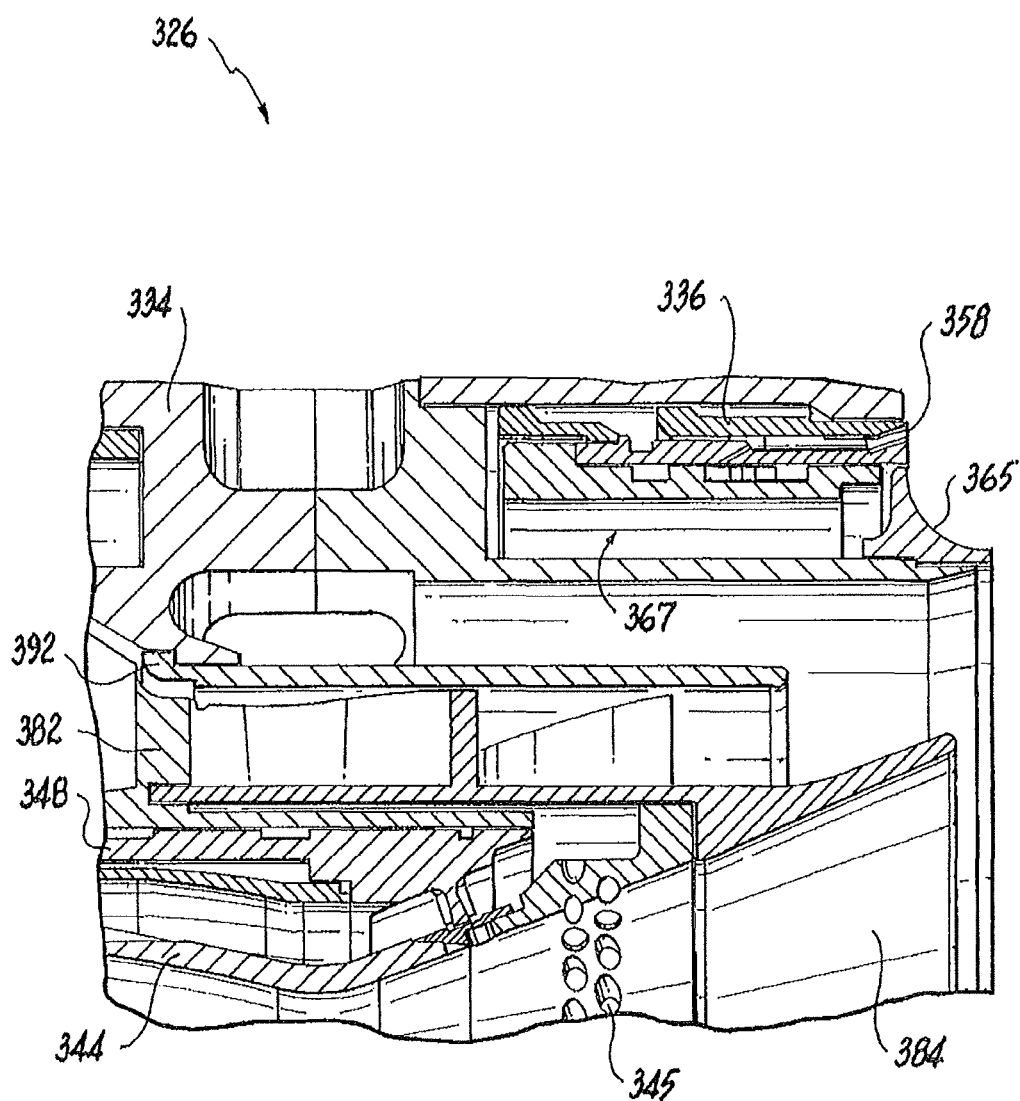
FIG. 10 is cross-sectional side elevation view of a portion of another exemplary embodiment of a recirculation product injection nozzle constructed in accordance with the present invention, showing the outlet portion of the nozzle with a filleted, downstream facing heat shield covering an insulation space inboard of the outer fuel injector ring.

With reference now to FIGS. 9 and 10, two further embodiments of RPI nozzles are shown. In FIG. 9, the outlet portion of RPI nozzle 226 is shown, including an outer air swirler 234, separator ring 292, intermediate air swirler 282, inner fuel injector 248, inner air swirler 244, and frustoconical tip 284, much as those described above with respect to RPI nozzle 126. Outer fuel injection ring 236 does not included a filleted downstream surface as in RPI nozzle 126 described above. Rather, a separate filleted heat shield ring component 265 is provided to serve the flow directing function described above with respect to face 165 described above. Additionally, heat shield ring component 265 provides an insulation gap 267 for shielding outer fuel injector 236 from the heat of combustion downstream thereof. Heat shield ring component 265 is a filleted cap brazed to the wall of outer air swirler 234 and not affixed directly to outer fuel injector 248. This reduces thermal conduction from heat shield ring component 265 to the outer fuel circuit.

In FIG. 10, the outlet portion of RPI nozzle 326 is shown, including an outer air swirler 334, separator ring 392, intermediate air swirler 382, inner fuel injector 348, inner air swirler 344, and frustoconical tip 384, much as those described above with respect to RPI nozzle 126. RPI nozzle 326 includes a filleted heat shield ring component 365 similar to ring component 265 described above. Insulation gap 367 is located substantially inboard of outer fuel injector 336, and extends downstream past a portion thereof adjacent the fuel injection orifices 358. This provides thermal shielding of outer fuel injector 336 from compressor discharge air passing through outer air swirler 334 and as well as from the heat of combustion downstream thereof. Inner air swirlers 244 and 344 each include downstream radial swirler ports 245 and 345 respectively, in which there is a double row of circular air injector ports around the circumference thereof, as opposed to the single row of downstream air injector ports in inner air swirler 144 described above, for injecting a swirling flow of air from the respective inner intermediate air circuits. An advantage of using a double row air injection port configuration is that the second row of ports add more effective area to the swirler while keeping a higher length to diameter ratio for better swirl than if a single row of larger ports were used. Those skilled in the art will readily appreciate that any suitable number of injector port rows can be used without departing from the spirit and scope of the invention.

Figure 11:
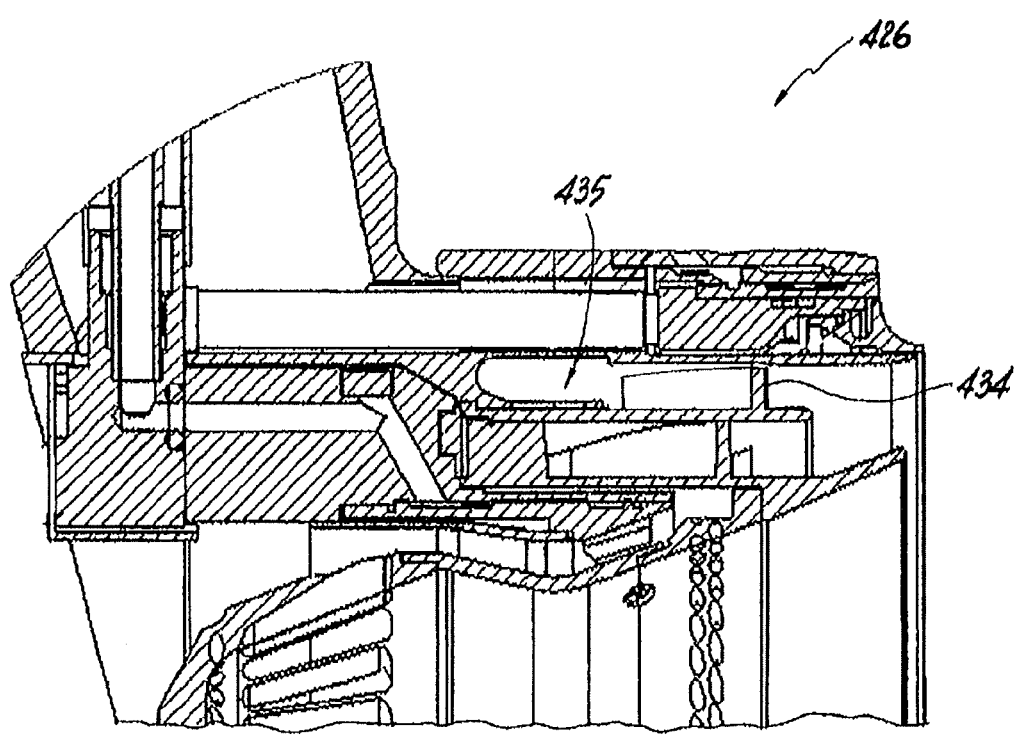
FIG. 11 is a cross-sectional side elevation view of a portion of another exemplary embodiment of a recirculation product injection nozzle constructed in accordance with the subject invention, showing the outer air swirler having an axial swirler configuration.
Figure 12:
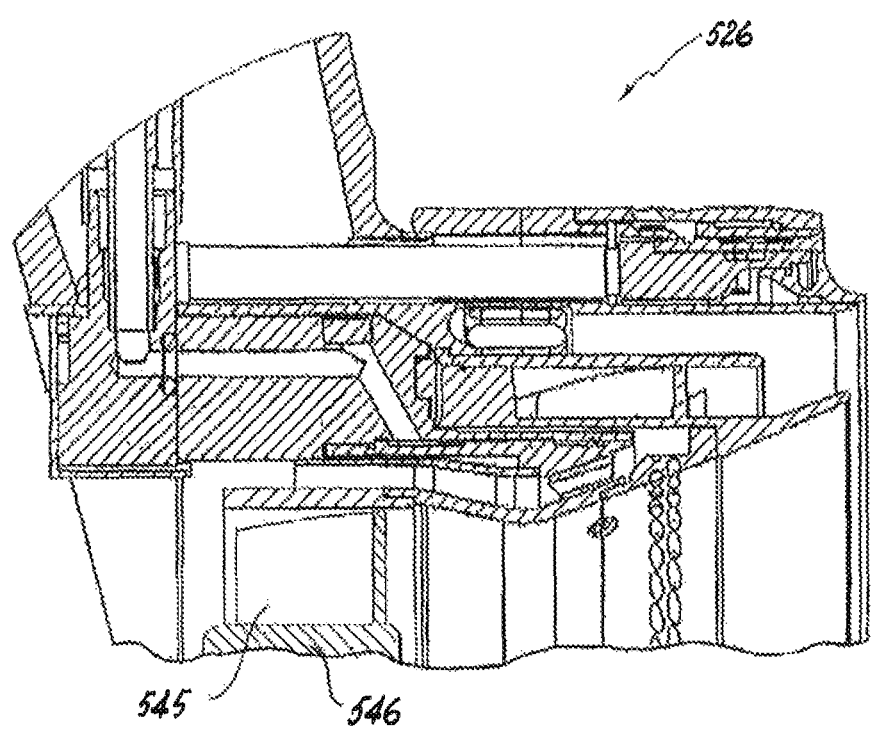
FIG. 12 is a cross-sectional side elevation view of a portion of another exemplary embodiment of the subject invention, showing the inner air swirler having an axial swirler configuration.

Referring now to FIGS. 11 and 12, while shown and described above with exemplary embodiments using radial air swirlers, those skilled in the art will readily appreciate that any suitable type of swirlers can be used in a device in accordance with the invention. Moreover, any suitable combination of swirler types, e.g., radial, axial, etc., can be used in combination with each other, e.g., in the inner, outer, and intermediate air circuits, in a single nozzle without departing from the spirit and scope of the invention. For example, in FIG. 11 an exemplary RPI nozzle 426, otherwise similar to those described above, includes an outer air swirler 434 that is an axial swirler rather than a radial swirler. In place of radial swirl ports, such as ports 135 described above, there is an open slot 435 with no swirl features upstream of axial air swirler 434. As another example, FIG. 12 shows another exemplary RPI nozzle 526, otherwise similar to those described above, but including an inner air swirler 545 that is an axial air swirler with a central bluff body 546, instead of a swirler dome with radial swirl slots as described above.

The systems and methods of the subject invention are capable of producing lean stable combustion and at very lean conditions in a mode of distributed combustion which has a multitude of benefits for gas turbine engines. Advantages of the systems and methods of the subject invention over traditional systems include:

- an envelope of distributed combustion that occurs at very lean fuel/air mixtures (approximately $\phi<0.5$) and simultaneously produces extremely low concentrations of unburned hydrocarbons (UHC), carbon monoxide (CO), and nitrous oxides ($NO_X$), wherein concentrations of all three species below 10 ppm can be achieved at the same time and condition;
- distributed combustion that decouples acoustics, fluid instabilities, and heat release instabilities, inhibiting instabilities at lean conditions from occurring—this decoupling results in lean stable combustion and low combustion acoustic levels;
- distributed combustion that eliminates hot spots (pockets of rich burn) and produces a homogeneous temperature pattern at the combustor exit reducing turbine wear and improving turbine efficiency; and
- capability when operating at less lean conditions, outside of the distributed combustion envelope, to produce very stable combustion with lower emissions and improved temperature pattern factor over conventional systems and traditional lean burn systems for gas turbine engines.

While described above in the exemplary context of annular combustors, those skilled in the art will readily appreciate that any suitable type of combustor can be used without departing from the spirit and scope of the invention.

The methods and systems of the present invention, as described above and shown in the drawings, provide for combustion in gas turbine engines with superior properties including the benefits of distributed combustion described above. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A recirculation product injection nozzle comprising:
   a) a nozzle housing having an inlet end and opposed outlet end, the nozzle housing defining a central axis along a direction from the inlet end to the outlet end;
   b) an outer air swirler mounted to the nozzle housing and configured to impart swirl to a flow of compressor discharge air from upstream of the inlet end passing through the outer air swirler with sufficient swirl strength to recirculate combustion products from downstream of the outlet end into an outer recirculation zone in proximity with the outlet end;
   c) an outer fuel injector mounted proximate to the outer air swirler and being configured and adapted to inject a spray of fuel into the outer recirculation zone;
   d) an inner air swirler mounted radially inboard of the outer air swirler and outer fuel injector with respect to the central axis, the inner air swirler including a central cavity defined therein along the central axis and being configured and adapted to impart swirl to a flow of compressor discharge air from upstream of the inlet end passing through the inner air swirler with sufficient swirl strength to recirculate combustion products from downstream of the outlet end into an inner recirculation zone radially inboard of the outer recirculation zone and extending into the central cavity;
   e) an inner fuel injector mounted radially outboard of the central cavity of the inner air swirler and configured to inject a spray of fuel through a layer of compressor discharge air from the inner air swirler and into the inner recirculation zone; and
   f) an inner intermediate air passage between the inner air swirler and the inner fuel injector, wherein the inner air swirler includes a radial air swirler defined therethrough in a downstream portion thereof for passage of air from the inner intermediate air passage into the central cavity.

2. A recirculation product injection nozzle as recited in claim 1, wherein the central cavity of the inner air swirler defines a converging diverging flow path, wherein the converging portion of the converging diverging flow path defines a throat of the inner air swirler, and wherein the throat is upstream of fuel injection points of the inner fuel injector.

3. A recirculation product injection nozzle as recited in claim 1, wherein the inner air swirler includes an inlet dome with radial swirl slots defined therethrough for introducing a swirling air flow into the central cavity.

4. A recirculation product injection nozzle as recited in claim 1, further comprising an outer intermediate air swirler disposed between the outer air swirler and the inner fuel injector, wherein the outer intermediate air swirler has a diverging outlet configured to direct outlet air from the outer air swirler and the outer intermediate air swirler at a diverging angle with respect to the central axis.

5. A recirculation product injection nozzle as recited in claim 4, wherein the diverging outlet of the outer intermediate air swirler has an inner surface that is flush with the central cavity of the inner air swirler.

6. A recirculation product injection nozzle as recited in claim 1, wherein the outer fuel injector is configured and adapted to inject a spray of fuel in a radially diverging direction with respect to the central axis.

7. A recirculation product injection nozzle as recited in claim 1, wherein the inner fuel injector is configured and adapted to inject a spray of fuel in a radially convergent direction with respect to the central axis.

8. A recirculation product injection nozzle as recited in claim 1, wherein the nozzle housing includes a fillet shaped downstream surface configured and adapted to direct recirculated combustion products in the outer recirculation zone into a downstream direction.

9. A recirculation product injection nozzle comprising:
   a) a nozzle housing having an inlet end and opposed outlet end, the nozzle housing defining a central axis along a direction from the inlet end to the outlet end;
   b) an outer air swirler ring mounted to the nozzle housing, and including a radial swirler configured to impart swirl to a flow of compressor discharge air from upstream of the inlet end with sufficient swirl strength to recirculate combustion products from downstream of the outlet end into an outer recirculation zone in proximity with the outlet end;
   c) an outer fuel injector ring mounted in an insulation cavity of the outer air swirler ring downstream of the radial swirler and configured and adapted to inject a spray of fuel into the outer recirculation zone downstream of the outlet end;
   d) a diffuser ring mounted radially inboard of the outer air swirler ring and including a diverging frustoconical outlet configured to direct compressor discharge air from the radial swirler of the outer air swirler ring in a diverging direction with respect to the central axis;
   e) an inner fuel injector ring mounted radially inboard of the diffuser ring and having a plurality of inward directed fuel injection ports;
   f) an inner air swirler mounted radially inboard of the diffuser ring, the inner air swirler including a central cavity defined therein along the central axis and being configured and adapted to impart swirl to a flow of compressor discharge air from upstream of the inlet end with sufficient swirl strength to recirculate combustion products from downstream of the outlet end into an inner recirculation zone radially inboard of the outer recirculation zone and extending into the central cavity, wherein the inner air swirler includes a plurality of apertures, each having a respective fuel injection port of the inner fuel injector ring proximate thereto for injecting fuel through a layer of compressor discharge air from the inner air swirler into the inner recirculation zone; and
   g) an inner intermediate air passage between the inner air swirler and the inner fuel injector ring, wherein the inner air swirler includes a radial air swirler defined therethrough in a downstream portion thereof for passage of air from the inner intermediate air passage into the central cavity.

10. A recirculation product injection nozzle as recited in claim 9, wherein the central cavity of the inner air swirler includes a throat that defines a converging diverging flow path with a first stagnation point defined at an upstream end of the central cavity and a second stagnation point defined at the throat.

11. A recirculation product injection nozzle as recited in claim 9, wherein the inner air swirler includes an inlet dome with radial swirl slots defined therethrough for introducing a swirling air flow into the central cavity.

12. A recirculation product injection nozzle as recited in claim 9, further comprising an outer intermediate air swirler disposed between the outer air swirler ring and the inner fuel injector ring, wherein the outer intermediate air swirler has a diverging outlet configured to direct outlet air from the outer air swirler ring and the outer intermediate air swirler at a diverging angle with respect to the central axis, and wherein the diverging outlet of the outer intermediate air swirler has an inner surface that is flush with the central cavity of the inner air swirler.

13. A recirculation product injection nozzle as recited in claim 12, wherein the outer fuel injector ring is configured and adapted to inject a spray of fuel in a radially diverging direction with respect to the central axis.

14. A recirculation product injection nozzle as recited in claim 13, wherein the nozzle housing includes a fillet shaped downstream surface configured and adapted to direct recirculated combustion products in the outer recirculation zone into a downstream direction.

15. A combustion system for a gas turbine engine comprising:
   a) an annular combustor body having an upstream wall with opposed radially inner and outer walls extending therefrom with a downstream opening between the radially inner and outer walls opposite the upstream wall for delivering combustion products to a turbine, the upstream wall including a plurality of injector ports; and
   b) a plurality of injectors each mounted to a respective injector port of the combustor body, each injector including a fuel inlet, an injector feed arm extending from the fuel inlet, and a recirculation product injection nozzle depending from the feed arm in fluid communication with the fuel inlet for injecting fuel and compressor discharge air into the combustor body, the recirculation product injection nozzle comprising:
      a) a nozzle housing having an inlet end and opposed outlet end, the nozzle housing defining a central axis along a direction from the inlet end to the outlet end;
      b) an outer air swirler mounted to the nozzle housing and configured to impart swirl to a flow of compressor discharge air from upstream of the inlet end passing through the outer air swirler with sufficient swirl strength to recirculate combustion products from downstream of the outlet end into an outer recirculation zone in proximity with the outlet end;
      c) an outer fuel injector mounted proximate to the outer air swirler and being configured and adapted to inject a spray of fuel into the outer recirculation zone;
      d) an inner air swirler mounted radially inboard of the outer air swirler and outer fuel injector with respect to the central axis, the inner air swirler including a central cavity defined therein along the central axis and being configured and adapted to impart swirl to a flow of compressor discharge air from upstream of the inlet end passing through the inner air swirler with sufficient swirl strength to recirculate combustion products from downstream of the outlet end into an inner recirculation zone radially inboard of the outer recirculation zone and extending into the central cavity;
      e) an inner fuel injector mounted radially outboard of the central cavity of the inner air swirler and configured to inject a spray of fuel through a layer of compressor discharge air from the inner air swirler and into the inner recirculation zone; and
      f) an inner intermediate air passage between the inner air swirler and the inner fuel injector, wherein the inner air swirler includes a radial air swirler defined therethrough in a downstream portion thereof for passage of air from the inner intermediate air passage into the central cavity.

16. A combustion system as recited in claim 15, wherein the combustor body and injectors are configured and adapted to introduce substantially all of the fuel and compressor discharge air into the combustor body through the injectors.

* * * * *